No. 821,178. PATENTED MAY 22, 1906.
J. C. LISTON.
LAND MARKER.
APPLICATION FILED AUG. 23, 1905.
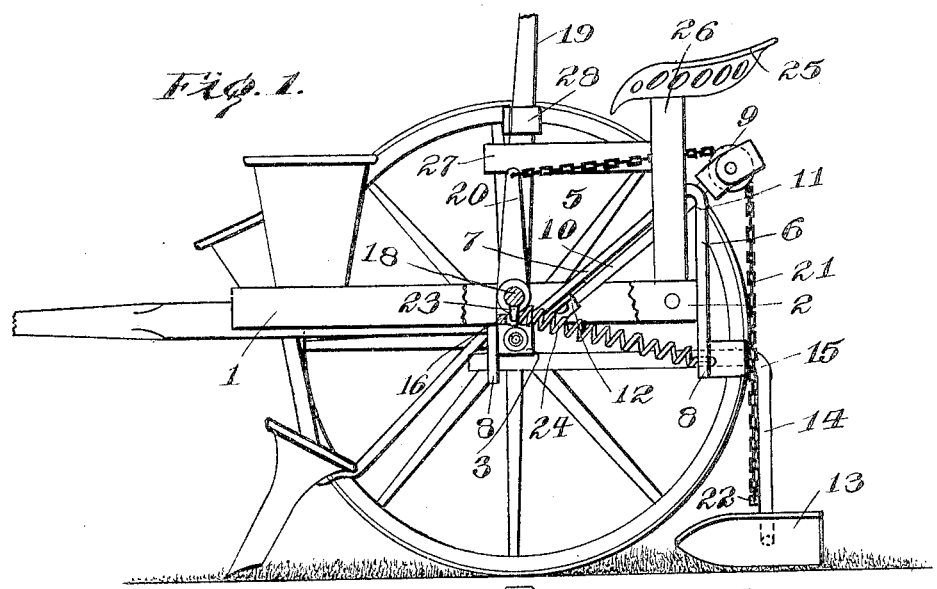
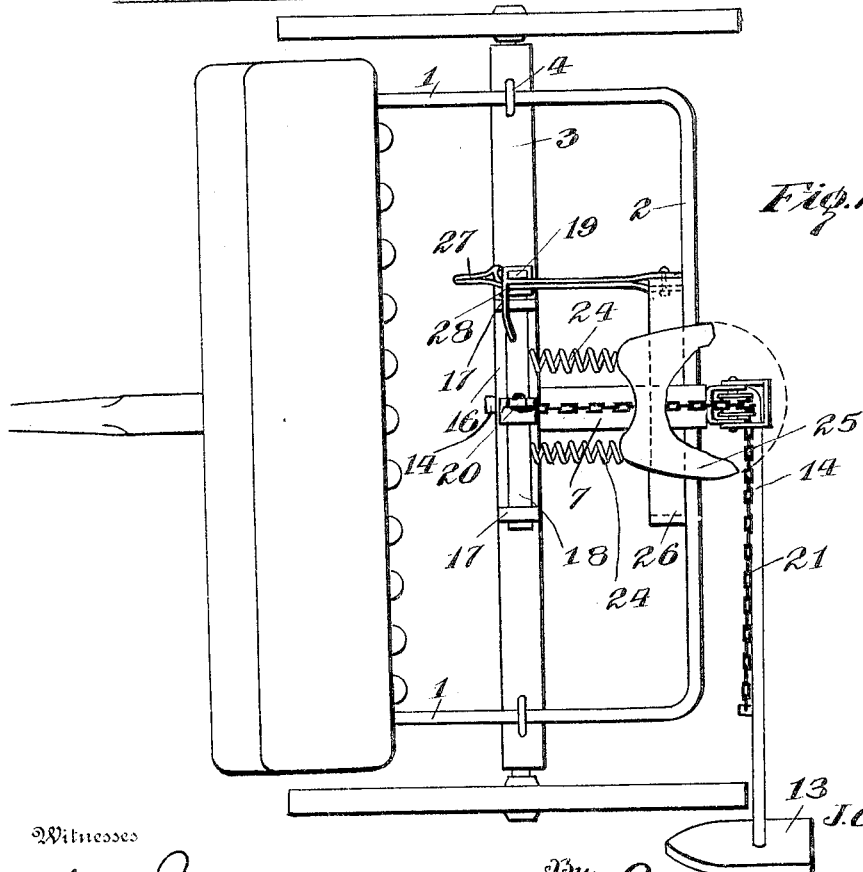
Witnesses
Henderson F. Hill
Inventor
J. C. Liston
By
R. F. A. B. Cacey
Attorneys

UNITED STATES PATENT OFFICE.

JAMES C. LISTON, OF CHATSWORTH, ILLINOIS.

LAND-MARKER.

No. 821,178.　　　　Specification of Letters Patent.　　　Patented May 22, 1906.

Application filed August 23, 1905. Serial No. 275,445.

*To all whom it may concern:*

Be it known that I, JAMES C. LISTON, a citizen of the United States, residing at Chatsworth, in the county of Livingston and State of Illinois, have invented certain new and useful Improvements in Land-Markers, of which the following is a specification.

This invention relates to improvements in agricultural implements, and more particularly to a marking attachment for planters. As ordinarily constructed much inconvenience is occasioned and considerable time lost owing to the fact that the operator is compelled to throw the marking-blade from one side to the other by hand and to hold it in a raised position while the planter is turning.

The object of this invention is to produce a device by means of which a marking-blade can be thrown from side to side or held in a raised position by the operator without removing from his seat.

A further object is to produce a device of this character which can be readily attached to any planter and which can be manufactured at a comparatively small cost.

For a full description of the invention and the merits thereof and also to acquire a knowledge of the details of construction of the means for effecting the result reference is to be had to the following description and accompanying drawings, in which—

Figure 1 is a side elevation of a planter, showing my improved form of marker attached thereto; and Fig. 2 is a top plan view of same.

Corresponding and like parts are referred to in the following description and indicated in both the views of the drawings by the same reference characters.

The device is shown as attached to the frame of a corn-planter of the usual construction, said frame comprising side bars 1, having their ends connected by a cross-bar 2. A transverse member 3, constituting in the present instance the axle, is secured to the side bars 1 by means of eyebolts 4, and a bracket 5 is attached to the cross-bar 2 and the transverse member 3. This bracket 5 is shown as comprising a metal bar which is bent upwardly at an intermediate point so as to form two arms, the rear one, 6, of which is approximately vertical, while the opposite arm 7 is inclined. The ends of the metal bar project below the frame and are provided with openings 8. A pulley 9 is journaled in the bracket 5 by means of a rod 10, which is passed through an opening 11 in the metal bar at the junction of the arms 6 and 7 and has its end mounted in a bearing 12, attached to the inclined arm 7. The marking-blade 13 is secured to the end of the arm 14, the opposite end of said arm being bent around at approximately right angles, as seen at 15, and passed through the openings 8, which serve as a bearing upon which the marking-blade can be swung from side to side. A metal strip 16 is secured to the transverse member 3 and has its ends bent upwardly at 17 and provided with openings through which a rod 18 is passed. A lever 19 is attached to one end of the rod 18, and an arm 20 extends upwardly from an intermediate point on said rod. A cable 21 passes over the pulley 9 and has one of its ends attached to the arm 20, while the opposite end is attached to an eye 22 on the arm 14, to which the marking-blade is attached. By this arrangement it will be seen that by pushing the lever 19 forward the arm 20 will pull the cable 21 and raise the marking-blade in an upright position. Lugs 23 project downward from the rod 18 on each side of the arm 20 and are connected with coil-springs 24, the opposite ends of which are secured to the portion of the bracket 5 which projects below the cross-bar 2. These springs 24 are normally in tension and tend to throw the lever 19 forward and to counteract the weight of the marking-blade. The seat 25 is mounted upon an arch 26 in the usual manner, one of the arms of said arch having a spring-catch 27 attached thereto, which is adapted to engage with the lever 19 to hold the same locked and permit the free operation of the marking-blade. A foot-piece 28 is secured to the lever 19, so that same can be pushed forward by means of the feet and the marking-blade thereby held in a raised position while the planter is being turned.

In operation the lever 19 is normally pulled back so as to be engaged by the spring-catch 27. The cable 21 is then loose and allows the marking-blade 13 to move up and down and accommodate itself to the inequalities in the level of the ground. When the end of the row is reached, the operator pushes the lever 19 forward so as to raise the marking-blade while turning, and then by giving the lever a quick push forward the marking-blade acquires a sufficient momentum to carry it past the dead-center, so that it will fall upon the opposite side of the planter. Owing to the fact that the pulley 9 is journaled upon the rod 10, it is allowed to turn so as to accommodate itself to the different positions of the cable 21 as the marking-blade is swung from side to side.

Having thus described the invention, what is claimed as new is—

1. In a land-marker, the combination with a suitable framework of a transverse bar or beam secured thereto, a bracket secured at one end to said beam and at the other end to the rear member of the frame, a shaft mounted on said bracket and below said beam, a marker-rod carrying the blade and secured to said shaft whereby it may turn from side to side, a rod mounted to turn in said bracket and provided at its upper end with a pulley or guide member, a lever mounted to turn on said beam, and a cable connecting said lever and marker-rod and passing over said pulley.

2. In a land-marker, the combination with a suitable frame of the transverse beam secured thereto, a bracket secured to the beam and to the rear bar of the frame the said bracket comprising an inclined member, a shaft mounted longitudinally of said bracket, a marker-rod secured to said shaft and carrying the blade designed to be moved to either side of the machine, a rod mounted in the inclined portion of said bracket and rotatable about its longitudinal axis, a pulley mounted on the upper side of said rod a lever mounted on said transverse rod or beam, a cable secured at one end to the marker-rod and passing over said pulley and an arm designed to move with said lever and secured to other end of said cable.

3. In a land-marker, the combination with a suitable framework including two transverse members, one in advance of the other a bracket secured to and between said members and rising therefrom, a rotatable rod mounted in said bracket provided at its upper end with a pulley, a longitudinally-extending shaft journaled in the frame, a marker-rod and blade carried by said shaft, a rod 18 mounted upon the forward transverse bar of the framework and provided with two outwardly-extending rods, and with an upwardly-extending arm in alinement with the bracket, a contractile spring connecting said lugs with the rear bar of the framework, a cable passing over said pulley and connected at its ends with a marker-rod and arm respectively and a lever connected with said rod 18 to move the same and designed for interlocking engagement with a portion of the framework.

In testimony whereof I affix my signature in presence of two witnesses.

JAMES C. LISTON. [L. S.]

Witnesses:
 EDWARD B. HERR,
 STEPHEN HERR